(No Model.)
T. F. MORRIN.
VALVE.
No. 347,727. Patented Aug. 17, 1886.
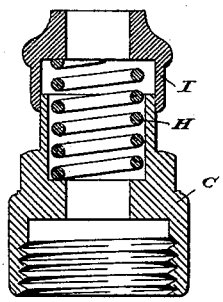
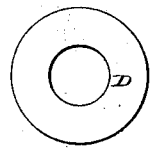
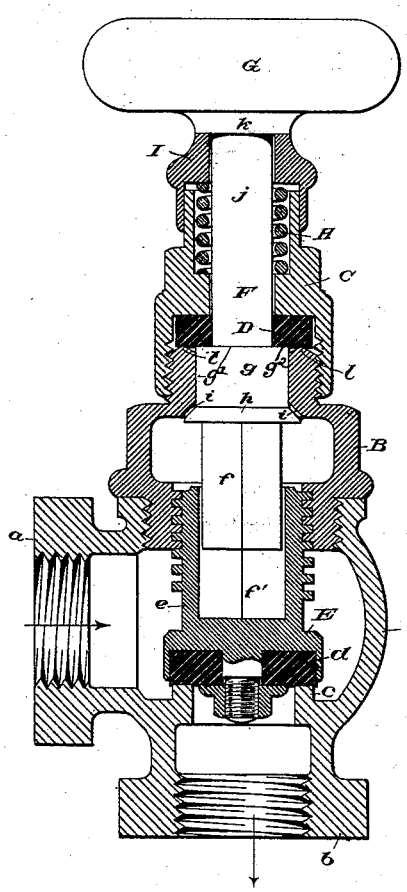
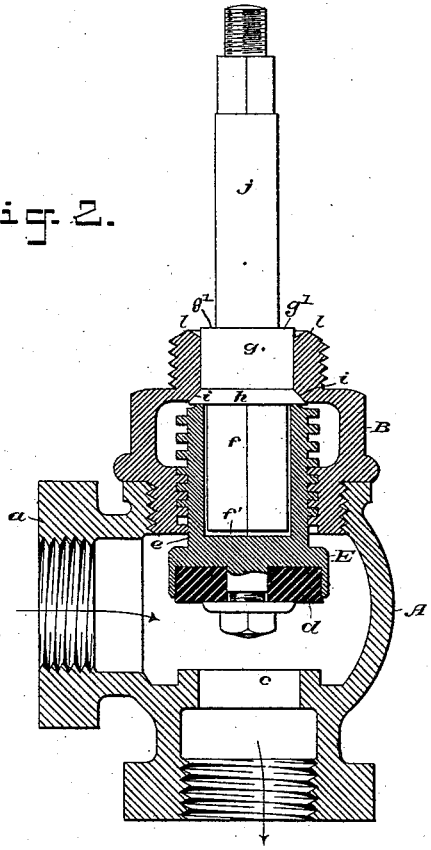
WITNESSES:
Geo. H. Fraser.
Geo Bainton
INVENTOR:
Thomas F. Morrin
By his Attorneys,
Busby, Fraser & Connett
N. PETERS, Photo-Lithographer, Washington, D.C.

UNITED STATES PATENT OFFICE.

THOMAS F. MORRIN, OF JERSEY CITY, NEW JERSEY.

VALVE.

SPECIFICATION forming part of Letters Patent No. 347,727, dated August 17, 1886.

Application filed April 7, 1886. Serial No. 198,133. (No model.)

*To all whom it may concern:*

Be it known that I, THOMAS F. MORRIN, a citizen of the United States, and a resident of Jersey City, Hudson county, New Jersey, have invented certain Improvements in Valves, of which the following is a specification.

My improved valve belongs to the general class of globe-valves—that is to say, valves arranged in sections of piping in order to control the flow of fluids through the same, the valve proper being run down to its seat by a screw.

My valve is especially well adapted for use with steam coils and radiators; but it may also be applied generally to purposes where such valves are usually required.

The object of my invention is to provide a durable valve that will not require frequent repair, and one from which the packing-ring may be conveniently removed and replaced while the steam or other fluid is on or flowing in the pipe.

As in some other valves of this general character, my valve has no "stem-packing," properly so called—that is to say, there is no stuffing-box packed with fibrous material to prevent the escape of fluid around the stem.

My invention employs three valves—namely, the main cut-off valve of the usual construction, a packing-valve held up to a packing-ring or shoulder by a spring, to prevent leakage around the stem, and a third valve which stands ordinarily off its seat, but which is capable of being closed tightly on its seat when the bonnet is removed, so that the packing-ring may be renewed or inspected, thereby preventing the escape of the fluid.

My invention will be hereinafter described, and its novel features carefully defined in the claims.

In the drawings which serve to illustrate my invention, Figure 1 is an axial section of the same, taken in the plane of the valve-stem axis and the axes of the pipe-connections.
Fig. 2 is a similar view showing the valve with the bonnet, packing, and spring removed. This view shows the valve proper off its seat, and the upper valve forced tightly up to its seat. Fig. 2$^a$ shows the bonnet, spring, and spring-cap detached; and Fig. 2$^b$ shows the packing-ring detached and in plan.

These views show the valve as usually constructed for use on steam-heating coils and radiators.

A represents the globular valve-casing, provided with an inlet-pipe connection, $a$, and an outlet-pipe connection, $b$. At the bottom of the casing, above the outlet, is formed the raised ring-like valve seat $c$, and at its upper part is an opening provided with internal screw-threads, into which is screwed a supplementary valve-casing, B, which, for convenience, I will call the "upper" casing. On the reduced upper portion of this upper casing is screwed the bonnet C, and between the top of casing B and the bonnet C is clamped a packing-ring, D. For this purpose I usually employ a ring of soft metallic packing, which is well known in the market.

E is the valve proper, as a whole. This valve is provided with a packing-ring, $d$, to rest on the valve-seat $c$, and with a screw-threaded shank, $e$, the square-threaded male screw on which engages a female screw in the upper casing, B, as clearly shown. By rotating the valve this screw causes it to move up and down, in a manner well understood.

F is the valve-stem, as a whole. Its lower end, $f$, is square or polygonal, and fits somewhat loosely in a socket, $f'$, of similar form, in the shank $e$ of the valve. The stem F also has a cylindrical enlarged section, $g$, which fits snugly in an aperture or bore in the upper part of the upper casing, B, a coned valve, $h$, which, under certain conditions, is brought up to a coned seat, $i$, and a reduced cylindrical portion, $j$, which passes through the packing-ring D, through the bonnet C, and is provided with an ordinary operating-handle or hand-wheel, G, at its outer end.
The upper end, $g'$, of the enlarged section $g$ of the stem forms a valve, which is drawn up against the lower face or under side, $g^2$, of the packing-ring D, which forms a valve-seat, by a spring, H, which embraces the upper part of the valve-stem, and is housed in an annular spring-cavity in the bonnet and between the bonnet and the stem. This spring abuts at its lower end against the bottom of the spring-cavity, and at its upper end against the under side of a washer-cap, I, which takes over the upper end of the bonnet, and is embraced between the spring H and a shoulder, $k$, on the hand-wheel G.

It will be seen that when the valve is in operative condition, as in Fig. 1, the bonnet C clamps or presses the packing D tightly down upon the upper margin of the upper casing, B, and that the spring H keeps the annular upper surface, $g'$, of the section $g$ of the valve-stem drawn up against the packing-ring. Under these conditions, and in order to permit this, the valve $h$ is held pressed a little off from its seat $i$. The space between the valves $g'$ and $h$ is a little greater than that between the valve-seats $g^2$ and $i$, as will be seen from inspection of Fig. 1. In operating the valve the stem F merely rotates, and does not move longitudinally, and the surfaces in wearing-contact are the upper surface of the section $g$ of the stem and the under surface of the packing-ring D.

The spring H takes up any wear. When the packing is so badly worn as to require renewal, the operation of removing it and substituting another may be effected in a few minutes, and while the fluid—as steam under pressure—is still on or passing through the pipes.

The operation is as follows: The bonnet C is first unscrewed a little, so as to permit the packing-ring D to rise. The spring H will now draw the valve $h$ up to its seat $i$. The valve-stem is rotated in the proper direction to raise the valve proper, E, which is run up until the upper end of its shank $e$ takes under the valve $h$, and prevents it from dropping away from its seat. This position of the parts is clearly shown in Fig. 2. The hand-wheel G is now taken off, and the bonnet C, packing-ring D, spring H, and washer-cap I may be readily slipped off the stem. When the parts are replaced, it will be necessary to run the valve E down a little before the packing-ring can be properly seated.

I usually cone the upper edge or margin of the upper casing, B, as best seen at $l$ in Fig. 2, in order that it may bite into the packing-ring and form a more reliable joint; but this is not essential. It is obvious that the parts must be so proportioned that the shank $e$ of the valve proper can be run up far enough to hold the valve $h$ up to its seat, as seen in Fig. 2. I usually so construct the parts that when the valve is in operative condition, as in Fig. 1, and the valve proper is full open, the shank $e$ will be in contact with valve $h$.

The packing-ring might be replaced by a removable metallic washer of some anti-friction metal, by preference.

In order to give the valve-stem a steady and firm bearing and guide, I provide it with a snug bearing in the casing B at the enlargement $g$ in the bonnet just below the spring-recess and in the washer-cap, which fits snugly over the end of the bonnet and plays on the latter. This cap forms thus a housing for the upper end of the spring and bonnet, and a guide for the stem.

The valve proper, E, forms of itself no part of my invention, and it may be a coned valve of an ordinary kind. I have shown a casing, A, also of a well-known kind; but any good form of casing may be employed with the outlets and inlets arranged in any convenient manner, either at right angles, as shown, or oppositely, as in an ordinary globe-valve.

I am aware that it is not new to provide the stem of a valve of this general character with an upper valve that is drawn up to its seat by a spring to form a stem-packing, and that in such valves the spring has been arranged exterior to such packing-valve, in order to remove it from contact with the fluid, and I do not claim this. The characteristic features of novelty of my invention are the three valves and the arrangement of the ring D, which forms the seat for the packing-valve, with its margins clamped, as shown. This clamping effectually prevents the passage of the fluid around the outer edge of the ring.

Having thus described my invention, I claim—

1. The combination, with the bonnet and valve-casing, provided, respectively, with valve-seats $g^2$ and $i$, of the valve-stem provided with valves $g'$ and $h$, fixed with respect to each other and arranged farther apart than their respective valve-seats, whereby the seating of one valve holds the other off from its seat, as set forth.

2. The combination, with the bonnet, the washer-cap, the spring, the upper casing provided with the valve-seat $i$, and the packing-ring clamped between said bonnet and upper casing, its under side forming a valve-seat, $g^2$, of the valve-stem, provided with valves $g'$ and $h$, fixed with respect to each other and arranged farther apart than their respective valve-seats $g^2$ and $i$, substantially as set forth.

In witness whereof I have hereunto signed my name in the presence of two subscribing witnesses.

THOMAS F. MORRIN.

Witnesses:
HENRY CONNETT,
GEO. BAINTON.